Jan. 26, 1937.  E. W. FORSTROM ET AL  2,069,087
APPARATUS FOR THE MANUFACTURE OF INSULATED WIRE
Filed Nov. 28, 1933
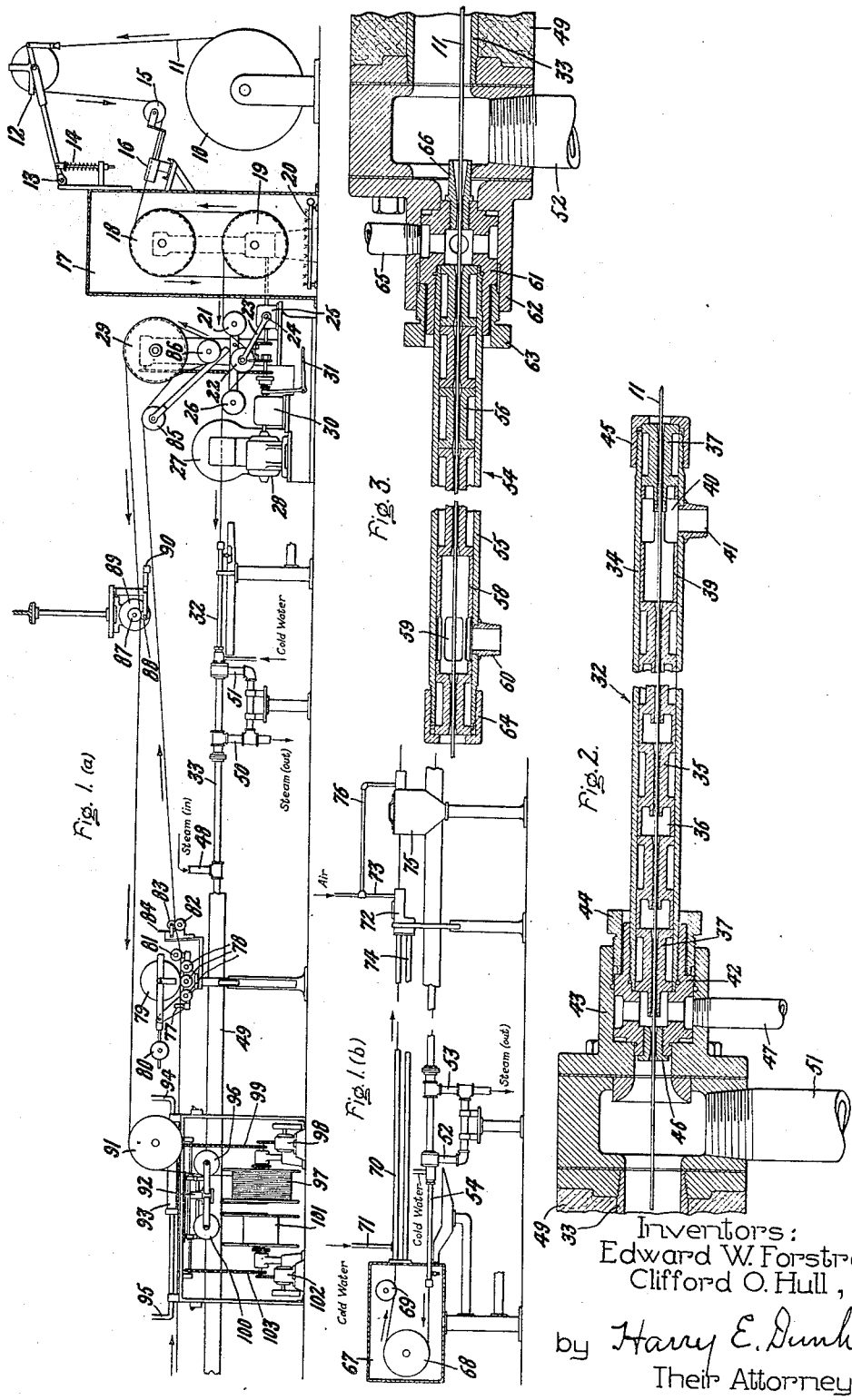
Inventors:
Edward W. Forstrom;
Clifford O. Hull,
by Harry E. Dunham
Their Attorney.

Patented Jan. 26, 1937

2,069,087

UNITED STATES PATENT OFFICE 2,069,087

APPARATUS FOR THE MANUFACTURE OF INSULATED WIRE

Edward W. Forstrom and Clifford O. Hull, Stratford, Conn., assignors to General Electric Company, a corporation of New York Application November 28, 1933, Serial No. 700,105

8 Claims. (Cl. 18—6)

Our invention relates to the manufacture of insulated wire by a continuous process.

The object of our invention is to provide an improved method and apparatus for the manufacture of insulated wire.

Another object of our invention is to increase the speed of vulcanization of a rubber insulation and at the same time improve the product.

A still further object is to provide an entrance and exit seal for the vulcanizing chamber which will not injure the rubber covering on the core as it passes into and out of the vulcanizing chamber.

What we consider to be novel and our invention will be better understood by reference to the following specification and appended claims when considered in connection with the accompanying drawing.

In the drawing Figs. 1 (a) and 1 (b) are side elevations of the apparatus used in the manufacture of the rubber covered wire in which the right hand end of Fig. 1 (b) is a continuation of the apparatus from the left hand end of Fig. 1 (a); Fig. 2 is a sectional view on an enlarged scale of the entrance seal of the vulcanizing chamber, and Fig. 3 is a similar view of the exit seal.

In the manufacture of rubber covered wire by a continuous process considerable difficulty is experienced in the passage of the core after the rubber has been extruded on it into the vulcanizing chamber. One of the problems is to prevent injury to the rubber covering as it is easily damaged while it is still in the plastic state before vulcanization. Another problem is to prevent escape of the vulcanizing medium without at the same time damaging the plastic rubber covering. Similarly difficulties are experienced in the passage of the core from the exit end of the vulcanizing chamber. The main problem is due to moisture or excess air which may be entrained in the core before it is covered with rubber. No damage is done to the rubber covering while it is in the vulcanizing chamber due to the high pressure of the vulcanizing medium. However, when the core passes out of the vulcanizing chamber and the pressure is suddenly reduced the expanding gas bursts through the rubber covering. This produces weak spots in the rubber which may result in a breakdown of the insulation in use or a condemning of a considerable length of the manufactured product. These difficulties are magnified as the speed of the manufacture of the rubber covered wire is increased.

These and other difficulties are overcome by our improved method and apparatus for the manufacture of rubber covered wire as will be explained in greater detail in the following description.

Referring to the drawing, 10 indicates a reel which carries a supply of the core 11 which is to be provided with a covering of insulation. Core 11 may consist of a bare wire or a wire provided with a covering of insulating material over which it is desired to provide an additional rubber covering. Also, core 11 may consist of a plurality of separately insulated conductors combined with a filler over which it is desired to provide an overall rubber covering. For the purposes of this description core 11 will be referred to as a wire. As wire 11 passes from reel 10 it is looped over a tension regulator 12 which is pivoted at 13 and provided with a spring bias 14. Upon a sudden increase of the speed of wire 11 the loop about tension regulator 12 is shortened until reel 10 is speeded up to feed the wire 11 at the desired speed. From tension regulator 12, wire 11 passes around an idler 15 through a wire straightener 16 into a preheat chamber 17. In preheat chamber 17, wire 11 passes over an idler 18 to a driven capstan 19. Idler 18 and capstan 19 are provided with a number of circular grooves and the wire is passed from idler 18 to capstan 19 and back to idler 18. The wire 11 may be passed about idler 18 and capstan 19 a number of times depending upon the amount of heating of wire 11 which is desired. A source of heat 20 is provided and as shown consists of a gas burner with a plurality of gas jets. Any other source of heat may be used. Preheat chamber 17 serves to regulate the temperature of the wire. Previously, difficulty was experienced in the covering of a wire with rubber and its subsequent vulcanization due to variation in temperature of the wire. To insure a relatively uniform temperature of the wire it was necessary to store the wire for a period of days in a room held at a constant temperature. This difficulty of course was greatly increased when the wire was being shipped in cold weather and so it was necessary to have a large stock of wire on hand in order to have some available which had been in the storage room for a considerable period of time. However, even though the reel of wire had been in the storage room for some time there was no certainty that the temperature of the wire on the reel throughout its length was uniform. The problem of heating a reel of large diameter having a considerable length of wire on it to insure a uniform temperature throughout the length of the wire is considerably greater than the heating of the wire as it passes through a chamber such as the preheat chamber 17. Also, the temperature of the wire passing from the preheat chamber 17 can be very closely regulated regardless of the temperature of the wire on reel 10 and can be made sufficiently high to assist in the vulcanization of the rubber which speeds up the vulcanization of the rubber and assures complete vulcanization throughout the rubber covering. When a core which has been previously insulated is to be provided with a rubber compound covering it may or may not be necessary to pass it through the preheat chamber 17. From preheat chamber 17, wire 11 passes over a guide 21 around an idler 22 which is supported by an arm 23 pivotally connected at 24 to a speed regulator 25. Speed regulator 25 is located in the driving connection of capstan 19 and serves to regulate the speed of the capstan 19 automatically depending upon the speed of wire 11. Any variation in the speed of the wire causes a movement of idler 22 due to the shortening or lengthening of the loop about it. From idler 22, wire 11 passes about a guide 26 and through an extruder 27. As the wire 11 passes through extruder 27 the rubber covering is provided. Extruder 27 is of a type well known to the art and it is believed unnecessary to describe its construction and operation. Extruder 27 is driven by a motor 28. Motor 28 is also connected to drive take-up capstan 29 directly and capstan 19 through speed regulator 25. Between the connection of motor 28 to capstan 19 and take-up capstan 29 a transmission 30 is provided which includes gears for speed variation and a clutch. A pedal 31 is provided by which the clutch may be disconnected to stop the feed of the wire 11 through the extruder 27. From extruder 27, wire 11 passes to the entrance seal 32 of the vulcanizing chamber 33. Seal 32 is provided and adapted to prevent damage to the rubber compound covering while the rubber compound is in the plastic state as it passes into the vulcanizing chamber 33. Seal 32 also prevents the escape of the vulcanizing medium which is maintained at a relatively high pressure in the vulcanizing chamber 33. Seal 32 will be better understood by reference to Fig. 2 in which it is shown on an enlarged scale in section. Seal 32 consists of a tube 34 in which are located a number of identical glands 35 which have a central opening sufficiently large to permit the easy passage of wire 11 with its rubber covering, and also have an enlarged concentric opening 36 at one end. The number of glands 35 provided depends upon the length of tube 34 which, in turn, is governed by the pressure of the vulcanizing medium as will be explained later. At opposite ends of tube 34, glands 37 are provided with central openings of the same diameter as the openings of glands 35. Glands 37 differ from glands 35 in that their central portion is longer and no enlarged opening is provided. At the entrance end of tube 34 between gland 37 and the adjacent gland 35 a spacer 39 is provided having openings 40 communicating with a nipple 41 secured in an opening in the bottom of tube 34. Tube 34 is threaded into a gland 42 which is secured in a flange 43 by a nut 44. Glands 35 and 37 and spacer 39 are secured in tube 34 by engagement at one end with a shoulder on gland 42 and by a clamping nut 45 on the entrance end of the tube 34. Flange 43 is connected to the vulcanizing chamber 33 and has an opening communicating therewith. Gland 42 has a screw threaded plug 46 at one end with a central opening for the passage of wire 11 with its rubber covering into the vulcanizing chamber 33. Gland 42 is also provided with radial openings communicating with a pipe 47 which is screw-threaded in an opening in the bottom of flange 43. Pipe 47 is connected to a fluid supply which may be water, air, or other suitable fluid at a pressure slightly in excess of the pressure of the vulcanizing medium in the vulcanizing chamber 33. This prevents the escape of the vulcanizing medium through the entrance seal 32 and a small amount of the water entering pipe 47 passes through nut 46 into the vulcanizing chamber. The greater portion of the water, however, passes through glands 35 and out of nipple 41. The pressure of the water is reduced as it passes through glands 35 sufficiently so that while a small amount may pass out through the entrance end of tube 34 the amount is limited by the reduction of the water pressure. Thus tube 34 must be sufficiently long so that the pressure of the water entering pipe 47 will be reduced to approximately atmospheric pressure near the entrance end of the tube. The water passes through the small central openings of glands 35 and due to the small clearance between these openings and the wire 11 with its rubber compound covering and also due to the high water pressure necessary to prevent the escape of the vulcanizing medium the water may attain a considerable velocity. The enlarged openings 36 provided in glands 35 serve to prevent an excessive velocity of the water being attained which would result in a turbulent flow and would damage the rubber covering by making the surface of the rubber covering uneven or even possibly stripping the rubber covering from the wire 11 and stopping up the central opening of glands 35. The velocity of the water flowing through the central openings of glands 35 is limited by the resistance to the continuous flow of the water by the enlarged openings 36. The eddy currents set up in the enlarged openings 36 reduce the pressure head at the entrance to the central opening of each gland 35. The arrangement of these enlarged openings is important as the rubber covering, prior to vulcanization, while it is still in its plastic state is very easily damaged and any unevenness in its surface would result in a weakening of its insulation as the thickness of insulation would be reduced at certain points. The pressure of water entering pipe 47 may only be a fraction of a pound in excess of the pressure of the vulcanizing medium as that is sufficient to prevent the escape of the vulcanizing medium.

Wire 11 passes from seal 32 into the vulcanizing chamber 33 which consists of a pipe into which is supplied a vulcanizing medium, such as steam, at one point or a plurality of points, one such supply being indicated at 48 in Fig. 1 (a). The pressure of the vulcanizing medium is determined by the length of the vulcanizing chamber 33 and by the speed at which it is desired to pass the wire with its rubber covering through the vulcanizing chamber. Vulcanizing chamber 33 is covered by a heat resisting insulation 49 to prevent excessive heat radiation due to the high temperature of the vulcanizing medium. To carry away any condensate and any water entering the vulcanizing chamber through entrance seal 32, drain pipes 50 and 51 are provided and connected to a steam trap which is not shown on the drawing. Similarly at the exit end of the vulcanizing chamber drain pipes 52 and 53 are provided and connected to a steam trap. To prevent escape of the vulcanizing medium as the wire 11 passes out of the vulcanizing chamber and also to prevent damage to the rubber covering of the wire as it leaves the vulcanizing chamber an exit seal 54 is provided which is shown on an enlarged scale in section in Fig. 3. Exit seal 54 is similar to entrance seal 32. A tube 55 is provided in which a number of glands 56 are located which have central openings through which the wire 11 with its vulcanized rubber covering passes with a small clearance. Between the gland 56 at the exit end of tube 55 and the next adjacent gland 56 is provided a spacer 58 which has openings 59 communicating with a nipple 60 secured in an opening in the bottom of tube 55. Tube 55 is in screw threaded engagement with a gland 61 located in flange 62 which is secured to the vulcanizing chamber 33. Gland 61 is secured in flange 62 by means of a nut 63. Glands 56 and spacer 58 are clamped in position in tube 55 by engagement with a shoulder on gland 61 at one end and by a clamping nut 64 threaded on the exit end of tube 55. Water is supplied to flange 61 by a pipe 65 and enters through openings provided in gland 61 into the central openings of glands 56. A plug 66 with a central opening is threaded into gland 61 in an opening provided in gland 62 communicating with the vulcanizing chamber. The water entering through pipe 65 is maintained at a pressure slightly in excess of the vulcanizing medium in the vulcanizing chamber 33 and this prevents the escape of the vulcanizing medium with wire 11 a small portion of the water passing through plug 66 into the vulcanizing chamber. The remainder of the water passes through central openings in glands 56 in the clearance between the wire 11 with its vulcanized rubber covering. Due to the fact that the rubber covering of wire 11 is vulcanized as it enters into the exit seal 55 it is unnecessary to provide enlarged openings in the glands 56 to reduce the velocity and turbulence of the water as in the case of entrance seal 32. The tube 55 is of sufficient length to cause a reduction in the water pressure as it travels from the end of tube 55 connected to gland 61 toward the exit end sufficiently so that it is approximately at atmospheric pressure and very little of the water escapes through the exit end of seal 55 with the wire 11, but instead is drained out through nipple 60. The gradual reduction in pressure of the water as it passes through tube 55 is of importance in addition to the fact that it prevents a large amount of the water escaping with the wire as it gradually reduces the pressure surrounding the covering of wire 11 as it moves from the vulcanizing chamber so that any air or moisture entrained in the core in case the wire 11 has previously been insulated before the rubber covering is applied, will not be suddenly released from a high pressure which might result in the rapid expansion of the entrained air or moisture bursting through the rubber covering and producing defects in the rubber covering. Simultaneously with the gradual reduction in pressure as wire 11 passes through tube 55 the covering of wire 11 becomes chilled due to the relatively low temperature of the water entering pipe 65, the largest portion of which subsequently flows through the central openings of glands 56 contacting the covering of wire 11 as it passes through tube 55. It is obvious, therefore, that the covering of wire 11 is suddenly reduced in temperature as it passes through tube 55 while subjected to the gradual reduction in pressure thus contracting the gases due to the entrained air or moisture under the rubber covering and consequently assisting to eliminate the explosion of the gases as the wire 11 leaves the exit seal. These latter advantages of the gradual reduction in the water pressure and reduction of temperature of the insulated wire in the exit seal 55 is important in the use of a continuous process for the vulcanization of overall rubber coverings on previously insulated conductors especially when a plurality of conductors are cabled together. It is practically impossible to completely remove all the entrained air and moisture from the fibrous filler and so some means is necessary to prevent escape of the entrained air and moisture through the rubber covering after its vulcanization and as it leaves the vulcanizing chamber. Wire 11 passes from the exit seal 55 into a chamber 67 about an idler 68. Chamber 67 is provided to drain the water which passes out through the exit end of seal 55 and may be carried by wire 11. Wire 11 then passes over a guide 69 and into a cooling tube 70. Cooling tube 70 is of relatively small diameter and is supplied with cold water at a low pressure through pipe 71. As the wire 11 passes from one end of tube 70 to the other at a relatively high velocity it carries with it the water fed at a low pressure, which water practically fills tube 70 and serves to cool the vulcanized rubber covering which is completely immersed in the water. The cooling of the rubber covering on wire 11 is desirable to prevent superaging of the rubber covering after it leaves the vulcanizing chamber due to the high temperature which it attains in its passage through the vulcanizing chamber 33. To remove the moisture from the rubber covering of wire 11 as it passes out of cooling tube 70 an air wiper 72 is provided into which air at a suitable pressure is fed through tube 73. The air wiper is not shown in detail but consists of a cylindrical nozzle which surrounds the wire by which air is directed in the opposite direction to that in which the wire is moving and causes the water to drain off through tube 74 back to cooling chamber 67. Wire 11 then passes through a chamber 75 in which soapstone is applied to the rubber covering to prevent the adjacent turns of the rubber covered wire on the take-up reel sticking together. The soapstone is applied in chamber 75 to the wire in liquid form so that a very thin coating is provided. The chamber 75 is connected by pipe 76 to pipe 73 which supplies the air to dry the rubber covering after the application of the soapstone. Wire 11 then passes between two vertical guide rolls 77 and over three idlers 78. Pivotally secured to the same support is a disc 79 which is in engagement with wire 11 just above center idler 78. Disc 79 is rotated by the movement of wire 11 and is connected to a mechanism not shown which records the number of feet of rubber covered wire manufactured. The weight of disc 79 and the recording mechanism connected to it is counter-balanced by a weight 80. Wire 11 next passes under a guide 81 to a grooved roll 82 above which is pivotally mounted a small disc 83 which engages the top of wire 11 as it passes over grooved roll 82. Connected to the arm on which small disc 83 is pivoted is a micrometer 84 which may give a direct reading of the diameter or may indicate variations in the diameter of the rubber covered wire. Wire 11 then passes over an idler 85 to take-up capstan 29. The wire passes completely around take-up capstan 29 to an idler 86 and then back over take-up capstan 29. From take-up capstan 29 the wire then passes between two rollers 87 and 88. Roller 87 is driven by a motor 89. Roller 88 is pivoted and counter-balanced by a weight 90 to hold wire 11 in engagement with roller 87. By this arrangement wire 11 is supported and positively driven between the take-up capstan 29 and the take-up reels. Wire 11 then passes over a guide pulley 91 which directs the wire to traverse 92. Guide 91 is connected to a piston in air cylinder 93. Air is supplied to air cylinder 93 through a pipe 94 or pipe 95 when it is desired to move guide 91 from one position to another. In the position indicated in the drawing, guide 91 directs wire 11 to guide 96 on the right of traverse 92. When in this position the wire 11 is directed to a take-up reel 97 on which the vulcanized rubber covered wire is being wound. Take-up reel 97 is driven by a motor 98. Motor 98 also drives traverse 92 through the intermediary of chain 99. When a sufficient length of wire has been wound on take-up reel 97 air is admitted to air cylinder 93 through pipe 94 and guide pulley 91 is shifted from the position indicated in the drawing to the left to a position which directs the wire to guide 100 on the left of traverse 92. The wire is then wound on take-up reel 101 and traverse 92 serves to distribute the wire evenly on the surface of the reel. Take-up reel 101 is driven by a motor 102 which is also connected by a chain 103 to drive traverse 92. The two reels 97 and 101 are driven at the same speed when the wire is shifted from the one to the other. After the wire is shifted it is severed between the reels by a cutter not shown. The motor driving the full reel may then be disconnected and the full reel replaced by an empty one. It is to be noted that while the preheat chamber 17 is shown as located adjacent to the extruder 27, it may be desirable to space the preheat chamber further from the extruder 27 in order to permit the application of an insulating cover of fibrous or other material about the wire prior to the passage of the wire into the extruder. In a like manner, it might be desirable to space the extruder 27 further from the entrance seal 32 to permit the application of a covering subsequent to the extruding of the rubber over the wire and prior to its entrance into the vulcanizing chamber. It may also be desirable to apply a protective covering of fibrous or other materials over the vulcanized rubber insulation at some convenient place along the return travel of wire 11 between the exit seal and the take-up equipment. By the arrangement of this apparatus the wire is first heated to a desired temperature to obtain a uniform temperature of the wire throughout its length and to cause the rubber covering when subsequently applied to adhere closely to the wire and to assist in the vulcanization of the rubber. The rubber covered wire is then passed into the vulcanizing chamber through a seal which prevents the escape of the vulcanizing medium and at the same time protects the rubber covering from damage as it enters the vulcanizing chamber. The rubber covering is vulcanized in its passage through the vulcanizing chamber. The speed at which the wire may be passed through the vulcanizing chamber depends upon the length of the vulcanizing chamber, the temperature of the vulcanizing medium, and the thickness of the rubber covering. The rubber covered wire is then passed out from the vulcanizing chamber through a seal which protects the vulcanized rubber covering and also prevents the escape of vulcanizing medium from the exit end of the vulcanizing chamber. The rubber covering is then cooled to prevent superaging of the rubber and to provide uniform cooling of the insulation. The wire with its vulcanized rubber covering is finally wound on a take-up reel. The method and combination of the apparatus which successively operates on the wire facilitates the speed with which the rubber covered wire can be manufactured and improves the product which may be produced. Obviously the invention is not limited to the provision of a rubber covering but may be used for the application of any plastic insulating material which requires vulcanization or heat treatment.

What we claim as new and desire to secure by Letters Patent of the United States is:

1. In an apparatus for applying a covering of insulating material to a core, means for applying insulating material to the core, a vulcanizing chamber, means for supplying a vulcanizing medium at a high pressure to the vulcanizing chamber, a seal for the vulcanizing chamber, means for supplying a fluid to said seal at a pressure in excess of the pressure in the vulcanizing medium in the vulcanizing chamber to prevent the escape of vulcanizing medium.

2. In an apparatus for applying a covering of insulating material to a core, means for applying the insulating material to the core, a vulcanizing chamber, means for supplying a vulcanizing medium to the chamber at a high pressure, a seal for the entrance end of the vulcanizing chamber through which the wire is adapted to pass into the vulcanizing chamber, means for supplying water to the entrance seal at a pressure above the pressure of the vulcanizing medium to prevent escape of the vulcanizing medium as the core enters the chamber, a second seal for the exit end of the vulcanizing chamber through which the core passes on leaving the chamber, and means for supplying water to said second seal at a pressure above the pressure of the vulcanizing medium to prevent escape of the vulcanizing medium as the core leaves the chamber.

3. In an apparatus for applying insulating material to a core, means for applying the insulating material to the core, a vulcanizing chamber, means for supplying vulcanizing medium to the chamber, a seal for the vulcanizing chamber comprising a tube, a plurality of glands secured in the tube having central openings for the passage of the core and enlarged openings, means for supplying water to the seal adjacent its connection to the vulcanizing chamber at a pressure above the pressure of the vulcanizing medium whereby the escape of the vulcanizing medium is prevented and damaged to the insulating material covering the core by the high pressure water is prevented by the enlarged openings of the glands which reduce the velocity of the water.

4. An apparatus for manufacturing rubber covered wire, means for applying a rubber covering to the wire, a vulcanizing chamber, means for supplying a vulcanizing medium to the chamber, a seal for the vulcanizing chamber, means for supplying a fluid to the seal at a pressure above the pressure of the vulcanizing medium, glands located in the seal having central openings for the passage of the wire and enlarged openings to reduce the velocity of the fluid passing through the seal to prevent damage to the rubber covering on the wire.

5. An apparatus for manufacturing rubber covered wire, means for applying the rubber covering to the wire, a vulcanizing chamber, means for supplying a vulcanizing medium to the chamber, a seal for each end of the vulcanizing chamber, means for supplying water to the seal at a pressure above the pressure of the vulcanizing medium in the chamber, and glands for the seal at the entrance end of the vulcanizing chamber having central openings for the passage of the wire and rubber covering, and enlarged openings to reduce the velocity of the water flowing through the seal to prevent damage to the rubber covering.

6. In an apparatus for manufacturing rubber covered wire, a heating chamber, means for controlling the temperature of the wire as it passes through the heating chamber, means for applying a covering to the wire after it leaves the heating chamber, a vulcanizing chamber, means for supplying a vulcanizing medium to the chamber, an entrance seal for the vulcanizing chamber through which the wire and rubber covering pass into the vulcanizing chamber, means for supplying water to the entrance seal at a pressure above the pressure of the vulcanizing medium to prevent escape of the vulcanizing medium, an exit seal for the vulcanizing chamber through which the wire and rubber covering are adapted to pass as they leave the vulcanizing chamber, and means for supplying water to the exit seal at a pressure above the pressure of the vulcanizing medium to prevent escape of the vulcanizing medium.

7. An apparatus for manufacturing rubber covered wire, a heating chamber, means for controlling the temperature of the wire as it passes through the heating chamber, means for applying the rubber cover to the wire after it leaves the heating chamber, a vulcanizing chamber, means for supplying a vulcanizing medium to the vulcanizing chamber, a seal for the entrance end of the chamber, means for supplying water to a seal at a pressure above the pressure of the vulcanizing medium to prevent escape of the vulcanizing medium, a seal for the vulcanizing chamber through which the wire is adapted to pass as it leaves the vulcanizing chamber, means for supplying water to the seal at a pressure above the pressure of the vulcanizing medium, a cooling tube through which wire is adapted to pass after it leaves the vulcanizing chamber, and means for supplying water at a low pressure to the cooling tube.

8. In an apparatus for manufacturing rubber covered wire, a heating chamber, means for controlling the temperature of the wire as it passes through the heating chamber, means for applying a rubber covering to the wire after it leaves the heating chamber, a vulcanizing chamber, means for supplying vulcanizing medium to the vulcanizing chamber, a seal for the vulcanizing chamber through which the wire is adapted to pass as it enters the vulcanizing chamber, means for supplying water to the seal at a pressure above the pressure of the vulcanizing medium to prevent the escape of the vulcanizing medium, a second seal for the vulcanizing chamber through which the wire is adapted to pass as it leaves the vulcanizing chamber, means for supplying water to said second seal at a pressure above the pressure of the vulcanizing medium to prevent escape of the vulcanizing medium, a cooling tube through which the wire is adapted to pass after it leaves the vulcanizing chamber, means for supplying water to the tube, and an air wiper to remove moisture from the wire as it leaves the cooling tube.

EDWARD W. FORSTROM.
CLIFFORD O. HULL.